United States Patent [19]

Wilting et al.

[11] Patent Number: 5,689,497

[45] Date of Patent: Nov. 18, 1997

[54] OPTICAL REGISTRATION MEDIUM WITH DUAL INFORMATION LAYER

[75] Inventors: Hermanis J. H. Wilting; Johannes T. H. Thijssen; Johannes C. N. Rijpers, all of Eindhoven, Netherlands

[73] Assignee: U.S. Philips Corporation, New York, N.Y.

[21] Appl. No.: 730,688

[22] Filed: Oct. 11, 1996

[30] Foreign Application Priority Data

Oct. 13, 1995 [EP] European Pat. Off. .............. 95202769

[51] Int. Cl.$^6$ .................................. G11B 7/24; G11B 3/74
[52] U.S. Cl. ................................... 369/275.1; 369/94
[58] Field of Search .......................... 369/275.1, 275.2, 369/275.3, 275.4, 94

[56] References Cited

U.S. PATENT DOCUMENTS

| | | | |
|---|---|---|---|
| 4,569,881 | 2/1986 | Freese et al. | 369/13 |
| 5,631,096 | 5/1997 | Nakajima et al. | 369/13 |

FOREIGN PATENT DOCUMENTS

0635825A1  1/1995  European Pat. Off. .

*Primary Examiner*—Nabil Hindi
*Attorney, Agent, or Firm*—Michael E. Belk

[57] ABSTRACT

A read-only optical registration medium which successively includes:

a transparent substrate;

a first registration surface containing localized level variations representing binary data bits;

a protective layer,
whereby:

between the substrate and the first registration surface, the medium further includes a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2 < n_1$ and $n_2 < n_3$, the trilayer being constituted so as to be transparent at $\lambda_1$ and to be semi-reflective at $\lambda_2$;

the surface of the trilayer nearest the substrate contains localized level variations representing binary data bits, thereby forming a second registration surface.

An alternative registration medium according to the invention successively includes:

a substrate (4);

a first registration surface containing localized level variations representing binary data bits;

a transparent protective layer,
whereby:

between the protective layer and the first registration surface, the medium further includes a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2 < n_1$ and $n_2 < n_3$, the trilayer being constituted so as to be transparent at $\lambda_1$ and to be semi-reflective at $\lambda_2$;

the surface of the trilayer nearest the protective layer contains localized level variations representing binary data bits, thereby forming a second registration surface.

14 Claims, 1 Drawing Sheet

OPTICAL REGISTRATION MEDIUM WITH DUAL INFORMATION LAYER

BACKGROUND OF THE INVENTION

The invention relates to a read-only optical registration medium which successively comprises:

a substrate;

a first registration surface containing localised level variations representing binary data bits;

a protective layer, whereby the substrate and/or the protective layer are transparent.

Such an optical registration medium can be read by scanning a focused light beam along its registration surface, and monitoring the light beam reflected therefrom. Because of the localised level variations in the registration surface, the phase of the reflected light beam will depend on the location of the point from which it is reflected, assuming the amplitude of the level-variations to be smaller than the coherency length of the incident light beam. Using interference effects, it thus becomes possible to optically read the topography of the registration surface. Depending on which of the two is transparent (at the wavelength $\lambda$ of the incident light beam), such scanning can be performed through either the substrate or the protective layer.

An example of a well-known optical registration medium as specified in the opening paragraph is the Compact Disc (CD), which can be embodied in various forms (e.g. CD-audio, CD-ROM, CD-interactive and photo-CD), all of which consist of one-sided polycarbonate discs having an embossed registration surface which is metallised and overlaid by a thin transparent resin layer. In these media, the localised level variations in the reflective registration surface are embodied as sharply-defined, micron-sized pits in an otherwise level plane. The depth of these pits is chosen to have a value $\lambda/4n$, where n is the refractive index of the medium through which the scanning light beam is incident (conventionally the substrate). As a result, a light beam reflected from the bottom of a pit will demonstrate a path-difference of $\lambda/2n$ (phase-difference of $\pi$) with respect to a light beam reflected from the surface of the surrounding plane.

A significant drawback of the present CD is that it does not have sufficient storage capacity to accommodate an average movie (both sound and vision) on its single registration surface. As a result, although the CD has rendered the gramophone record virtually defunct, and has also substantially replaced the Compact Cassette, it has not yet been able to seriously compete with the VHS video tape as a commercial audio/video carrier.

One means of addressing this capacity problem is discussed in European Patent Application EP 0 635 825, which describes a medium having stacked registration surfaces. These surfaces are optically accessed from a single side of the disc, by shifting the focal plane of the incident light beam to any of a number of discrete positions corresponding to the locations of the various registration surfaces. However, this approach is plagued by considerable focusing-error problems, whereby unwanted reflected light from a foreground or background registration surface can confuse the tracking optics in a playback device, causing it to lose its focus on the registration surface being read at that time. In addition, the need to focus discretely at various depths in the disc requires the use of complicated mechanics and servo-electronics in the read "head".

An alternative to the approach in the preceding paragraph is to make the CD double-sided, i.e. to provide a registration surface upon each major face of its substrate disc. However, such an approach has a number of significant disadvantages. For example:

Assuming that the two registration surfaces are not individually accessed by means of a focal-plane shift (as in the previous paragraph), then each registration surface must be read via the immediately overlying (thin) protective layer instead of via the underlying (thick) substrate (which no longer has to be transparent). As a result, dust or scratches on the surface of the disc will produce far greater noise than in the case of substrate-incident reading, since such unwanted surficial features eclipse a greater fraction of the focusing cone as their proximity to the focal point (i.e. the registration surface) increases; Because such a disc is double-sided, it must either be turned over as soon as the first registration surface has been read (which necessitates an undesirable playback interruption) or it must be read using a play-back device which positions a focused light beam at each side of the disc plane (thereby causing an increase in the physical size of the play-back device). Only in the second scenario can both registration surfaces be read simultaneously; Since optical access is required from both sides of the disc, an identification label cannot be applied to one of the disc faces.

SUMMARY OF THE INVENTION

It is an object of the invention to provide an optical registration medium having increased storage capacity compared to corresponding state-of-the-art media. Specifically, it is an object of the invention to produce an optical registration medium having dual registration surfaces. Moreover, it is an object of the invention that it should be possible to read both registration surfaces in such a medium from a single side. In particular, it is an object of the invention that the novel medium should at least be capable of accommodating a movie (audio and video content) having a duration of two hours.

These and other objects are achieved according to the invention in two distinct media, namely:

(1) A read-only optical registration medium which successively comprises:

a transparent substrate;

a first registration surface containing localised level variations representing binary data bits;

a protective layer, characterised in that:

between the substrate and the first registration surface, the medium further comprises a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2 < n_1$ and $n_2 < n_3$, the trilayer being constituted so as to be transparent at $\lambda_1$ and to be semi-reflective at $\lambda_2$;

the surface of the trilayer nearest the substrate contains localised level variations representing binary data bits, thereby forming a second registration surface.

(2) A read-only optical registration medium which successively comprises:

a substrate;

a first registration surface containing localised level variations representing binary data bits;

a transparent protective layer, characterised in that:

between the protective layer and the first registration surface, the medium further comprises a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2 < n_1$ and $n_2 < n_3$, the trilayer being constituted so as to be transparent at $\lambda_1$ and to be semi-reflective at $\lambda_2$;

the surface of the trilayer nearest the protective layer contains localised level variations representing binary data bits, thereby forming a second registration surface.

The term "transparent" should here be interpreted as indicating a transmission of at least 85%, and preferably at least 90%, whereas the term "semi-reflective" should here be interpreted as indicating a reflection of about 25–40%. Medium (1) can be read from the substrate side, and medium (2) can be read from the side of the protective layer.

The dielectric trilayer in the inventive medium is thus constituted that it acts as a window at $\lambda_1$ and partially as a mirror at $\lambda_2$. Consequently, light directed towards the first registration surface via the dielectric trilayer can follow two different paths, depending upon its wavelength $\lambda$:

If $\lambda=\lambda_1$, then the incident light beam will penetrate beyond the (nearer) second registration surface, and will be reflected from the (more remote) first registration surface;

If $\lambda=\lambda_2$, then the incident light beam will be reflected from both registration surfaces, though at generally different intensities.

The mechanism of the invention as described in the previous paragraph relies on the fact that the respective Reflection Coefficients $R_1$, $R_2$ and Transmission Coefficients $T_1$, $T_2$ at the first and second registration surfaces are functions of wavelength, and demonstrate substantially different values at the wavelengths $\lambda_1$ and $\lambda_2$. Assuming an incident light beam to have an intensity I (and to enter from that side of the medium to which the second registration surface is closest), then (with reference to FIGS. 1 and 2) the intensity of the reflected beam from the first registration surface will be:

$$I_1(\lambda)=IT_2R_1T_2=IR_1T_2^2,$$

and the intensity of the reflected beam from the second registration surface will be:

$$I_2(\lambda)=IR_2.$$

It will be specifically demonstrated in a particular embodiment herebelow that $I_1$ and $I_2$ can have drastically different values at $\lambda_1$ and $\lambda_2$.

The employed thicknesses of the individual layers in the dielectric trilayer (hereinafter respectively denoted by $t_1$, $t_2$ and $t_3$) will depend on the particular values of $n_1$, $n_2$ and $n_3$ in a given embodiment, as well as on the desired values of $\lambda_1$ and $\lambda_2$. In general, each of these thicknesses will have a value of the order of 10–100 nm, though smaller or larger values are also possible.

Ideally, all three constituent layers in the inventive medium's dielectric trilayer have an absorption coefficient k=0 (k being the imaginary part of the complex refractive index $\bar{n}=n+ik$). In practice, however, this condition cannot be perfectly achieved, and one should therefore endeavour to achieve a value of k which is as small as possible.

The dual registration surfaces in the inventive optical registration medium may be read either simultaneously or consecutively. In a specific application of the former method, one of the dual registration surfaces can be encoded with audio information and the other can be encoded with video information, so that simultaneous play results in a motion picture such as a movie, pop video, television program, etc.

It should be explicitly noted that the substrate referred to in the context of the current invention may have various forms, and may in particular be embodied as a flexible or rigid disc (e.g. of polycarbonate), or as a flexible elongated tape (e.g. of roughened polyethene terephthalate). In addition, although the invention provides dual registration surfaces which can be read from a single side of the said substrate, this does not preclude the occurrence of yet another registration surface (or surfaces) at the other side of the substrate. In particular, one can envisage a double-sided disc which has an inventive dual registration surface on each side; such a disc can be read on either side via its protective layer (type (2) medium).

A preferential embodiment of the inventive registration medium is characterised in that, at $\lambda_1=780$ nm and at $\lambda_2=630$ nm:

$2.5 \leq n_1 \leq 3.5$;
$1.5 \leq n_2 \leq 2.0$;
$2.5 \leq n_3 \leq 3.5$.

The quoted value of $\lambda_1$ is the current CD standard wavelength, whereas the stated value of $\lambda_2$ is the recently agreed supplementary CD standard wavelength. These wavelengths can be obtained from lasers based on the respective material systems GaAs/AlGaAs and GaAs/InGaP/InAlGaP, for example. An immediate advantage of such an embodiment is its backwards-compatibility: the first registration surface can be read by a conventional CD player ($\lambda=780$ nm), whereas both registration surfaces can be read by a new-style player employing two laser wavelengths.

An advantageous embodiment of the inventive registration medium is characterised in that the first and third dielectric layers comprise a material selected from the group consisting of zirconium nitride, silicon carbide and zirconium aluminium nitride, and that the second dielectric layer comprises a material selected from the group consisting of silicon oxide, silicon nitride, yttrium oxide, aluminium oxide and aluminium nitride. It should be noted that, in the case of multivalent elements, the terms "nitride", "carbide" and "oxide" as here employed are intended to encompass the various compounds which can result from such multiple valency: for example, "silicon oxide" should be seen as referring to either $SiO_2$ or sub-oxides like SiO. All of the listed materials can be readily provided using, for example, sputter deposition, physical vapour deposition or laser ablation deposition (all in a reactive gaseous atmosphere), or by chemical vapour deposition. In addition, their refractive indices all fall within the ranges stipulated in the previous paragraph, and their absorption coefficients are negligible.

As an alternative to the above-mentioned embodiment, it is also possible, for example, to use various dyes in the first and/or third dielectric layers, so as to achieve a relatively large n-value together with a relatively small k-value. Such a dye can, for example, be dissolved in an organic resin, which can then be applied in the form of a layer by spin-coating, spraying, roller-coating, dip-coating, etc., before being subsequently hardened (e.g. by curing or drying). A specific example of a suitable such dye is butyl-benzo-indo-carbocyanine, for which n=3.050 and k=0.058 (at 780 nm).

It should be explicitly noted that the first and third dielectric layers do not have to have the same material constitution.

In a particular embodiment of the inventive registration medium investigated by the inventors, a transparent polycarbonate substrate disc was overlaid by a dielectric trilayer consisting of sputtered ZrN, AlN and ZrN layers. These layers were respectively characterised by the values:

$t_1=t_3\approx26$ nm, $t_2\approx97$ nm, $n_1=n_3\approx3$, $n_2\approx2$.

The said trilayer was itself overlaid by a layer of cured polyacrylate resin, whose exposed surface was metallised with a thin film of Al. For light incident via the substrate, it was found that:

At $\lambda_1=780$ nm:

$R_1\approx0.75$, $R_2\approx0$, $T_2\approx1.0$, so that $I_1\approx0.75I$ and $I_2\approx0$;

At $\lambda_2=630$ nm:

$R_1=R_2\approx0.3$, $T_2\approx0.7$, so that $I_1\approx0.151$ and $I_2\approx0.3I$.

In this case, it is obvious that, at 630 nm, both the first and the second registration surfaces can be read, but that the reflected intensity from the second registration surface is twice as great as that from the first registration surface. This substantial difference in intensity reduces the risk of occurrence of tracking errors as a result of unwanted background reflections (from the first registration surface).

A particular embodiment of the inventive medium is characterised in that the first registration surface is metallised, i.e. provided with a metallic reflection layer. Such a reflection layer may comprise a pure metal or an alloy, and may be provided using sputter deposition, vapour deposition or laser ablation deposition, for example. Exemplary materials for this purpose include aluminium, gold, copper, silver, and their alloys. Use of such a reflection layer ensures that, when the registration surface is scanned with a focused light beam, enough light intensity is reflected to yield an acceptable output signal level.

An alternative embodiment of the inventive medium is characterised in that use is made of at least one dye to ensure that the (complex) refractive index of the material at one side of the first registration surface has a substantially different value to the (complex) refractive index of the material at the other side of the first registration surface (at $\lambda=\lambda_1$, at least). In this manner, it is possible to substantially increase the value of $R_1$. In particular, for a sufficient difference in refractive index, Total Internal Reflection can be induced at this interface, with a relatively small associated Brewster angle. The said difference in complex refractive index $\bar{n}$ may lie either in n or in k, or both. However, in the case of a dye employed at the light-incident side of the first registration surface, the value of k for that dye should be as small as possible.

As a specific example of the embodiment just discussed, reference is made to a medium in which the first registration surface is embossed in a layer $L_a$ of a polyacrylate resin, and is then overlaid by a protective layer $L_b$ of a polyurethane resin. It is assumed that this medium is to be read via its substrate, which implies that $L_a$ is at the light-incident side of the first registration surface. In such a case, one may, for example, incorporate a pyrylium-4,4'-cyanine dye (n=3.270, k=0.570 at 780 nm) in the layer $L_b$, or the aforementioned butyl-benzo-indo-carbocyanine dye (n=3.050, k=0.058 at 780 nm) in the layer $L_a$.

It should be explicitly noted that the registration medium according to the invention may comprise various other layers in addition to those referred to heretofore. For example, an adhesion-promoting layer (of zirconium oxide, for example) may be employed on the embossed surface on which the dielectric trilayer is provided. Alternatively, additional dielectric layers may be employed in conjunction with the said dielectric trilayer.

BRIEF DESCRIPTION OF THE DRAWINGS

The invention and its attendant advantages will be further elucidated with the aid of exemplary embodiments and the accompanying schematic drawings (not to scale), whereby.

DESCRIPTION OF THE PREFERRED EMBODIMENTS

Embodiment 1

Figure 1:
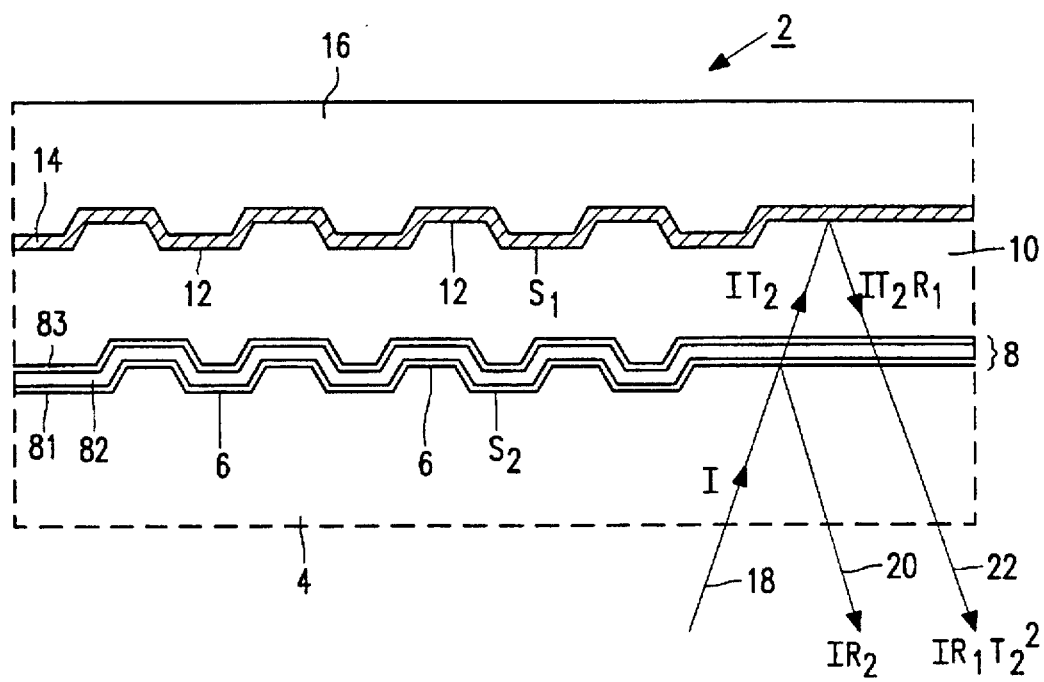
FIG. 1 renders a cross-sectional view of part of a particular embodiment of an optical registration medium according to claim 1 of the invention.

FIG. 1 is a cross-sectional depiction of part of an optical registration medium 2 according to claim 1 of the invention. A substrate 4 is embossed on one side so as to form a surface 6 containing localised level variations which represent binary data bits. For example, such variations may be embodied as a pattern of pits in an otherwise level surface, these pits being of uniform depth (e.g. 150 nm) and width (e.g. 500 nm), but having variable length.

A dielectric trilayer 8 has been deposited directly on the surface 6. This trilayer 8 comprises first, second and third dielectric layers 81, 82, 83 having respective thicknesses $t_1$, $t_2$, $t_3$ and refractive indices $n_1$, $n_2$, $n_3$. The materials of the layers 81, 82, 83 are thus chosen that, at both $\lambda_1=780$ nm and $\lambda_2=630$ nm:

$n_2<n_1$ and $n_2<n_3$.

In combination with these refractive indices, the values of $t_1$, $t_2$ and $t_3$ are thus chosen that the trilayer 8 is transparent at $\lambda_1$ and semi-reflective at $\lambda_2$. The surface 6 corresponds to the "second registration surface" $S_2$ referred to in claim 1.

The trilayer 8 is overlaid by a transparent layer 10 whose upper surface has been embossed so as to form a surface 12 containing localised level variations which represent binary data bits (e.g. embodied as pits such as those described hereabove). This surface 12 has been metallised with a thin reflective film 14, which is overlaid by a protective layer 16. The surface 12 corresponds to the "first registration surface" $S_1$ referred to in claim 1.

The Figure also depicts a light beam 18 which is incident on the surface $S_2$ via the substrate 4. Such a beam 18 will, in general, undergo partial reflection at the surface $S_2$. If the incident intensity of the beam 18 is I, then the intensity of the beam 20 reflected from the surface $S_2$ will be $IR_2$ (=$I_2$).

The beam 18 will also, in general, undergo partial penetration of the surface $S_2$, with an intensity $IT_2$. This penetrative beam will undergo reflection at the surface $S_1$, and the reflected beam which thus arises will emerge through the substrate 4 as a beam 22 of intensity $IR_1T_2^2$ (=$I_1$).

As already discussed hereabove, the values of $I_1$ and $I_2$ depend strongly on the wavelength of the incident beam 18.

Embodiment 2

Figure 2:
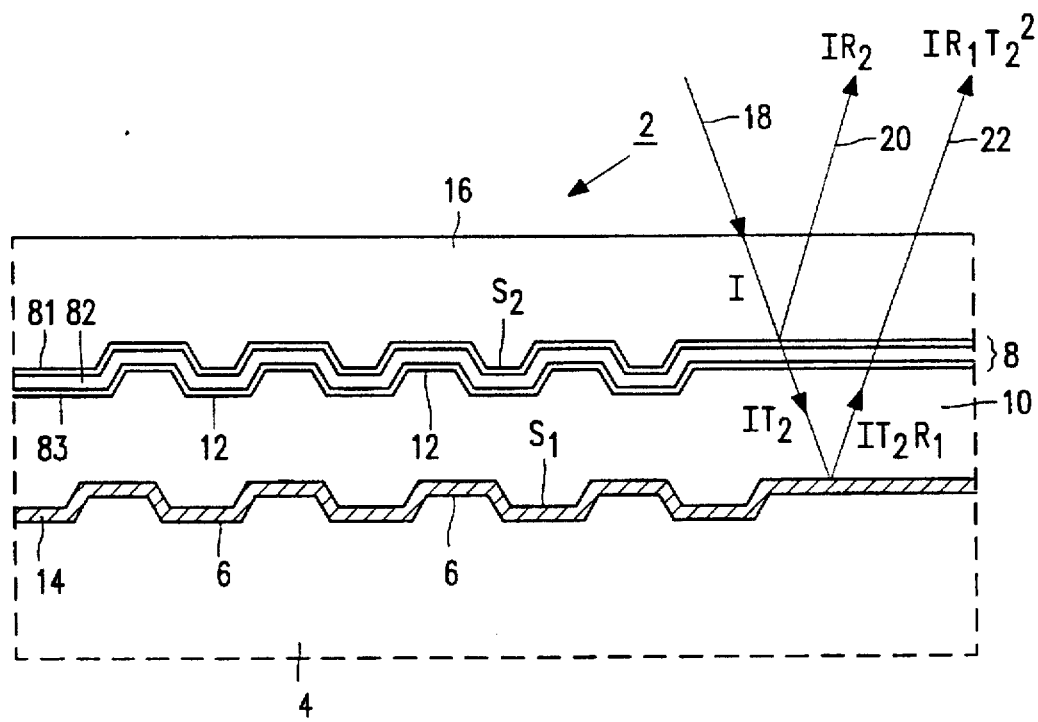
FIG. 2 renders a cross-sectional view of part of a particular embodiment of an optical registration medium according to the invention.

FIG. 2 shows a cross-section of part of a particular embodiment of an optical registration medium in accordance with claim 2 of the invention. Those features in FIG. 2 which correspond to given features in FIG. 1 have been given the same reference labels.

The medium 2 comprises a substrate 4 which has been embossed on one side so as to form a surface 6 containing localised level variations which represent binary data bits (e.g. in the form of the pits referred to in Embodiment 1). This surface 6 is metallised with a thin reflective film 14 so as to form the "first registration surface" $S_1$ referred to in claim 2.

The layer 14 is overlaid by a transparent layer 10 whose upper surface has been embossed so as to form a surface 12 containing localised level variations which represent binary data bits (e.g. in the form of the said pits). A dielectric trilayer 8 has been deposited directly on this surface 12. This trilayer 8 comprises first, second and third dielectric layers 81, 82, 83 having respective thicknesses $t_1$, $t_2$, $t_3$ and refractive indices $n_1$, $n_2$, $n_3$. The materials of the layers 81, 82, 83 are thus chosen that, at both $\lambda_1=780$ nm and $\lambda_2=630$ nm:

$n_2<n_1$ and $n_2<n_3$.

In combination with these refractive indices, the values of $t_1$, $t_2$ and $t_3$ are thus chosen that the trilayer 8 is transparent at $\lambda_1$ and semi-reflective at $\lambda_2$. The surface of the trilayer 8 remote from the substrate 4 corresponds to the "second registration surface" $S_2$ referred to in claim 2. This surface $S_2$ is overlaid by a protective layer 16.

FIG. 2 also shows a light beam 18 which is incident on the surface $S_2$ via the protective layer 16. Such a beam 18 will, in general, undergo partial reflection at the surface $S_2$. If the incident intensity of the beam 18 is I, then the intensity of the beam 20 reflected from the surface $S_2$ will be $IR_2$ (=$I_2$).

The beam 18 will also, in general, undergo partial penetration of the surface $S_2$, with an intensity $IT_2$. This penetrative beam will undergo reflection at the surface $S_1$, and the reflected beam which thus arises will emerge through the protective layer 16 as a beam 22 of intensity $IR_1T_2^2$ (=$I_1$).

Once again, the values of $I_1$ and $I_2$ depend strongly on the wavelength of the incident beam 18.

Embodiment 3

With reference to FIGS. 1 and 2, the various labelled constituents may have the following exemplary specifications:

4: transparent polycarbonate disc, diameter 12 cm and thickness 1.2 mm. An alternative is glass. A thickness of 0.6 mm is also conceivable in future discs;

81: sputter-deposited ZrN, $t_1$=23–29 nm. Alternatives include ZrAlN and $SiC_x$;

82: sputter-deposited AlN, $t_2$=94–100 nm. Alternatives include SiO, SiN, $Y_2O_3$ and $Al_2O_3$;

83: same as 81 ($t_3=t_1$);

10: spin-coated, UV-cured transparent polyacrylate resin layer, thickness 20–40 μm.

Alternatives include transparent polyurethane resins;

14: sputter-deposited aluminium, thickness 50–80 nm. Alternatives include Au, Ag, and Cu;

16: similar to 10, but with a thickness of 3–10 μm. Alternatives include transparent inorganic coatings such as $SiO_2$ and $Si_3N_4$ (thickness 100–500 nm).

Embodiment 4

In the case of the medium depicted in FIG. 2, the substrate 4 may be embodied as a flexible longitudinal tape. A suitable material for this purpose is, for example, polyethene terephthalate (PET) containing dispersed microscopic fillers (e.g. $SiO_2$ particles with a diameter of 400 nm) or having a rough backing layer (e.g. 300-nm chromium trioxide particles embedded in a resin binder. More information with regard to the fundamental constitution of such an optical registration tape can be gleaned from non-prepublished European Patent Application No. 95202686.2 (PHN 15.500).

Embodiment 5

In a medium as discussed in Embodiment 3, the layers 81 and 83 each comprise silicon carbide ($SiC_x$) with a refractive index $n_1=n_3\approx3$, and the layer 82 comprises silicon carbide with a refractive index $n_2\approx2$. All three layers 81,82,83 were sputter-deposited in a reactive hydrocarbon atmosphere from a Si sputter block. The composition of the reactive atmosphere determined the refractive index of the resulting layer.

In a specific example, the reactive atmosphere comprised a mixture of $C_2H_2$ and Ar. The sputter target was a Si plate with a face area of 127×445 $mm^2$, and the sputter power was 2.5 kW. The composition of the reactive atmosphere was as follows:

| | | |
|---|---|---|
| For $n_1 = n_3 \approx 3$: | Ar flow: | 120 sccm |
| | $C_2H_2$ flow: | 12.5 sccm |
| For $n_2 \approx 2$: | Ar flow: | 120 sccm |
| | $C_2H_2$ flow: | 20 sccm |

As an alternative to silicon carbide, the layer 82 could have comprised SiN, for example.

We claim:

1. A read-only optical registration medium which successively comprises:

a transparent substrate;

a first registration surface containing localised level variations representing binary data bits;

a protective layer, characterised in that:

between the substrate and the first registration surface, the medium further comprises a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2<n_1$ and $n_2<n_3$, the trilayer being constituted so as to be transparent at $\lambda_1$ and to be semi-reflective at $\lambda_2$;

the surface of the trilayer nearest the substrate contains localised level variations representing binary data bits, thereby forming a second registration surface.

2. A read-only optical registration medium which successively comprises:

a substrate;

a first registration surface containing localised level variations representing binary data bits;

a transparent protective layer, characterised in that:

between the protective layer and the first registration surface, the medium further comprises a dielectric trilayer which contains a first, second and third dielectric layer having respective refractive indices $n_1$, $n_2$ and $n_3$, whereby, at both a first wavelength $\lambda_1$ and a second wavelength $\lambda_2$:

$n_2<n_1$ and $n_2<n_3$, the trilayer being constituted so as to be transparent at $\lambda_1$ and to be semi-reflective at $\lambda_2$;

the surface of the trilayer nearest the protective layer contains localised level variations representing binary data bits, thereby forming a second registration surface.

3. An optical registration medium according to claim 1, characterised in that, at $\lambda_1=780$ nm and at $\lambda_2=630$ nm:

$2.5 \leq n_1 \leq 3.5;$ $1.5 \leq n_2 \leq 2.0;$ $2.5 \leq n_3 \leq 3.5.$

4. An optical registration medium according to claim 1, characterised in that the first and third dielectric layers comprise a material selected from the group consisting of zirconium nitride, silicon carbide and zirconium aluminium nitride, and that the second dielectric layer comprises a material selected from the group consisting of silicon oxide, silicon nitride, yttrium oxide, aluminium oxide and aluminium nitride.

5. An optical registration medium according to claim 1, characterised in that the first registration surface is metallised.

6. An optical registration medium according to claim 1, characterised in that the refractive index of the material at one side of the first registration surface has a substantially different value to the refractive index of the material at the other side of the first registration surface.

7. An optical registration medium according to claim 1, characterised in that the substrate has the form of a disc.

8. An optical registration medium according to claim 1, characterised in that the substrate has the form of a flexible, elongated tape.

9. An optical registration medium according to claim 2, characterised in that, at $\lambda_1 = 780$ nm and at $\lambda_2 = 630$ nm:

$2.5 \leq n_1 \leq 3.5;$ $1.5 \leq n_2 \leq 2.0;$ $2.5 \leq n_3 \leq 3.5.$

10. An optical registration medium according to claim 2, characterised in that the first and third dielectric layers comprise a material selected from the group consisting of zirconium nitride, silicon carbide and zirconium aluminum nitride, and that the second dielectric layer comprises a material selected from the group consisting of silicon oxide, silicon nitride, yttrium oxide, aluminum oxide and aluminium nitride.

11. An optical registration medium according to claim 2, characterised in that the first registration surface is metallised.

12. An optical registration medium according to claim 2, characterised in that the refractive index of the material at one side of the first registration surface has a substantially different value to the refractive index of the material at the other side of the first registration surface.

13. An optical registration medium according to claim 2, characterised in that the substrate has the form of a disc.

14. An optical registration medium according to claim 2, characterised in that the substrate has the form of a flexible, elongated tape.

\* \* \* \* \*